Dec. 18, 1956 G. GLACIUS 2,774,157
ANIMATED DISPLAY DEVICE
Filed June 24, 1954 2 Sheets-Sheet 1

INVENTOR:
GEORGE GLACIUS
BY
Frederick Breitenfeld
ATTORNEY

Dec. 18, 1956
G. GLACIUS
2,774,157
ANIMATED DISPLAY DEVICE
Filed June 24, 1954
2 Sheets-Sheet 2
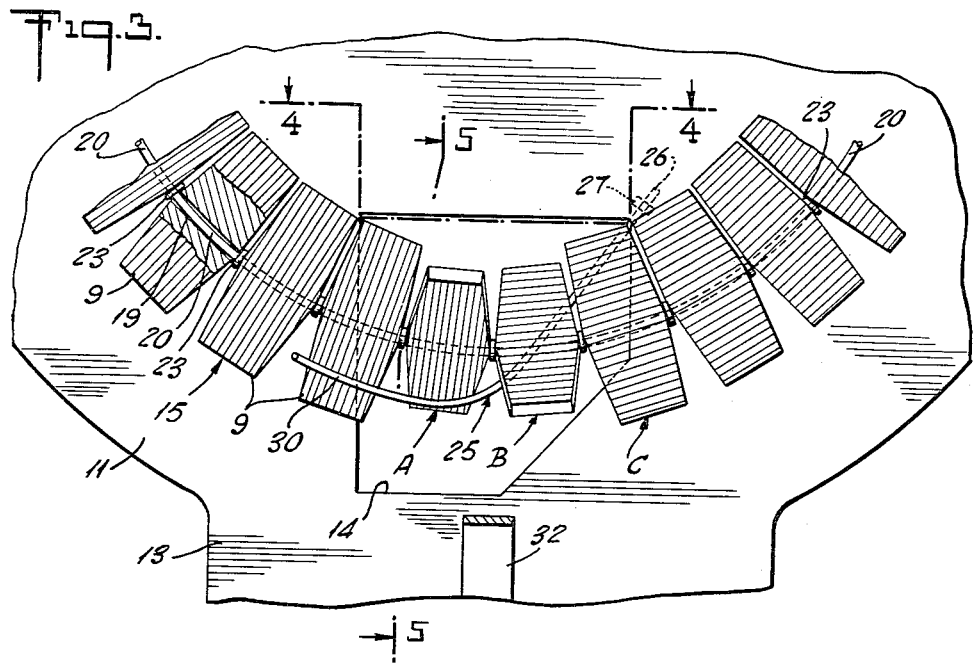
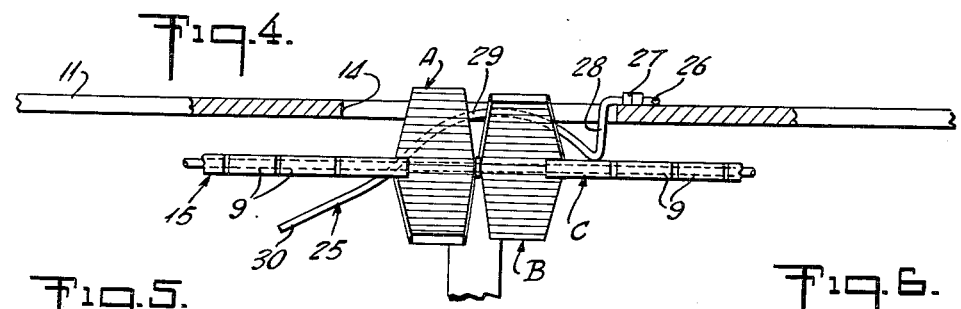
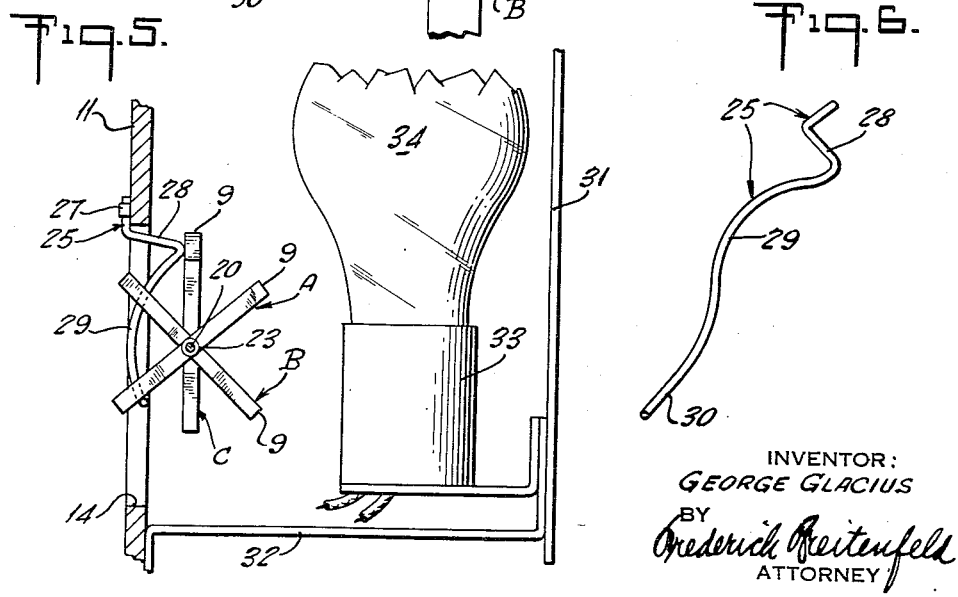
INVENTOR:
GEORGE GLACIUS
BY
Frederick Reitenfeld
ATTORNEY

United States Patent Office 2,774,157
Patented Dec. 18, 1956

2,774,157

ANIMATED DISPLAY DEVICE

George Glacius, Freeport, N. Y., assignor to Einson-Freeman Co., Inc., Long Island City, N. Y., a corporation of Delaware Application June 24, 1954, Serial No. 438,956

13 Claims. (Cl. 40—68)

This invention relates generally to animated or moving display devices, and is particularly directed to devices adapted to afford an observer different and changing visual effects.

It is a general object of the invention to provide a display device of the type described in which the changing visual effects are produced by a plurality of display elements carried along a predetermined path and supported for individual rotation relative to the path, there being a stationary element or cam adapted to cause individual rotation of the display elements upon movement of the latter along the path.

The display device can serve to present the mystical effect of plural trains of information alternately appearing to the observer and then disappearing again. The changing display may comprise verbal advertising messages, or a series of pictures, or merely changing color combinations or the like, depending upon the attention-arresting effect desired.

It is a further object of the invention to provide a display device having the advantageous characteristics mentioned and which is essentially simple in construction and mode of operation, and reliable in its functioning. The structure is of a kind that can be manufactured at a relatively low cost, and is thus particularly well adapted for point-of-purchase advertising. In addition, the display device is completely automatic and fool-proof in operation, and can be made of relatively light-weight and inexpensive materials, to provide economy in manufacture, transportation and handling, and use.

Other objects of the present invention will become apparent upon reading the following specification and referring to the accompanying drawings, which form a material part of this disclosure.

The invention accordingly consists in the features of construction, combinations of elements, and arrangements of parts exemplified in the construction hereinafter described.

In the drawings:

Figure 3 is an enlarged fragmentary view taken substantially along the line 3—3 of Figure 2;

Figure 4 is a sectional view taken substantially along the line 4—4 of Figure 3;

Figure 5 is a partial, sectional view taken substantially along the line 5—5 of Figure 3; and Figure 6 is a perspective view showing the stationary element or cam by itself.

Figure 1:
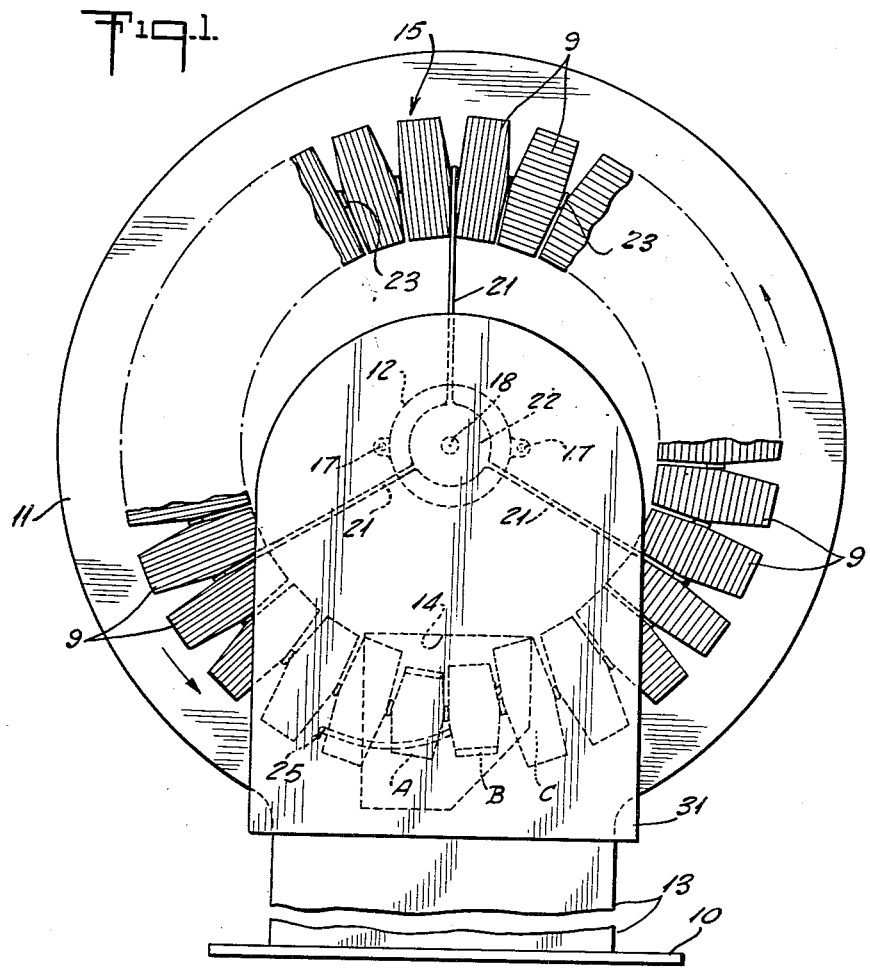
Figure 1 is a front elevational view, partly broken away, showing a display device constructed in accordance with the present invention.
Figure 2:
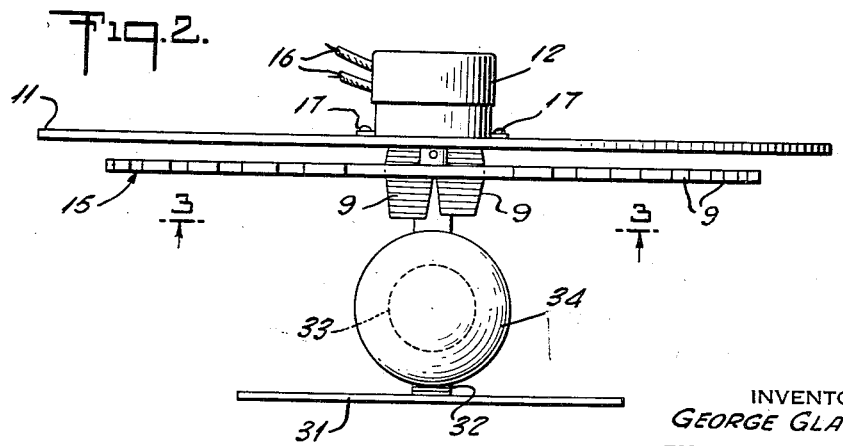
Figure 2 is a top plan view of the device of Figure 1.

Referring now more particularly to the drawings, the embodiment of the invention illustrated therein comprises a base 10 of any suitable character, upon which is mounted an upstanding background member or plate 11. The latter supports on its rear and front sides, respectively, a motor 12 and a display generally designated 15.

The background member 11 may be of any desired configuration according to the motif of the display, being shown for purposes of illustration as circular. It is composed of appropriate sheet material, e. g., cardboard or its equivalent. It includes a supporting portion or stem 13 secured to the base 10, but it is provided with a through opening or cutout 14 above the stem but near the lower part of the panel 11.

The motor 12 may be any conventional, lightweight kind, of relatively minute power, and wires 16 are provided for connection to a source of electric power. The motor is fixed to the rear side of the background member 11, as by rivets 17, 17. A rotatable motor drive shaft 18 projects from the motor forwardly through the background member 11 for supporting the display 15.

The display 15 includes an endless, generally circular carrier member or hoop 20 arranged directly in front of and adjacent to the background plate 11, concentric with respect to the motor shaft 18 and having a plurality of inwardly extending radial struts 21 secured at their inner ends, as by the disc 22, to the motor shaft. In this manner, the hoop 20 is mounted for rotation about its own axis. It will be noted that the hoop or carrier is so positioned that all hoop points pass in front of and adjacent to the opening 14 upon rotation of the hoop.

Mounted circumferentially about the hoop 20 are a plurality of display elements 9, which may take the form of generally flat, paddle-like members, each rotatable on the adjacent hoop portion about a transverse, medial axis of the display element. More particularly, each of the plate-like display elements or paddles 9 includes a transversely extending, medial bore 19 (Figure 3) through which the adjacent hoop portion extends. The bore 19 is large enough in diameter to support the paddle for free rotation. As the hoop 20 is disposed adjacent to the background member 11, undesired rotation of the paddles 9 about their individual medial axes is normally limited and substantially prevented, by engagement of the paddle ends with the background member; but the paddles are free to rotate whenever they are located in front of the opening 14.

The paddles 9 are preferably arranged about the hoop 20 in close side-by-side proximity, so as to conjointly present to view a composite arcuate display area, as best seen in Figure 1. Washers 23 are preferably circumposed about the hoop between adjacent paddles to isolate the latter for independent rotation about their individual axes.

While the hoop has been illustrated and described as being continuously arcuate or circular, it will be understood that the hoop may be formed with a plurality of relatively straight hoop segments, each adapted to support one of the paddles 9.

Fixedly secured to the background member 11 adjacent to the opening 14 is a stationary, elongated member or cam, generally designated 25. The cam may be formed of a length of stiff wire or other suitable material. One end 26 is made fast to the rear surface of the background member, as by staples 27 or other suitable securing means. The cam extends sharply forwardly, as at 28 (Figures 4 and 5) through the opening 14, and then curves generally spirally, as at 29 toward the left, as seen from the front. The spirally curved cam portion 29 extends rearwardly through the opening 14, then forwardly again toward its free end 30. Thus, the cam portion 29 is disposed for the most part rearwardly of the hoop plane, while the free end portion 30 extends through and forwardly of the hoop plane.

In operation, counter-clockwise hoop rotation causes the paddles 9 to pass in front of and adjacent to the opening 14 so that the radially outward paddle portions are engaged by the free end of the cam. Upon continued counter-clockwise hoop rotation, the radially outward paddle portions are engaged by the spiral cam portion 29 and turned rearwards and inwards through the opening 14. By way of example, as seen in Figures 3 and 5, the paddle A has just engaged with the spiral cam portion 29 and commenced turning about its axis, while the paddle B has moved with the hoop further to the right and completed a rotation of approximately 135°.

The paddle C is in engagement with the extreme right hand end of the spiral cam portion 29, and is about to discontinue contact with the latter, having been turned approximately 180° about its transverse medial axis. Thus, the paddle C is again substantially coplanar with the hoop 20 and travels in this relation about the hoop axis until it again encounters the cam 25.

It will thus be seen that the cam 25 serves to successively reverse the display elements 9, so as to present to view opposite faces of the latter upon alternate revolutions of the hoop. As represented schematically in the drawings (longitudinal shading lines indicating one color such as red, and transverse lines indicating another color such as blue), the opposite paddle faces can be so marked as to cooperate to define different trains of information, upon rotation of the hoop 20 about its axis. Thus, as seen in Figure 1, the paddles 9 approach the stationary cam 25 with their "red" sides facing forward, and leave the cam with their "blue" sides facing forward. Of course, various other indicia, such as words, and aesthetic combinations and arrangements of pictures, words or colors, may be imprinted on the paddle faces, as may be desired.

It should be understood that the display elements 9 need not be flat, but may be of multi-facet configuration, and the cam element may be configured to effect less than 180° rotation, as desired, to increase the number and variety of visual effects afforded by the device.

In order to conceal the opening 14 and cam 25, and thereby impart interesting mystification to the display effect a baffle or shield plate 31 is preferably arranged in front of and spaced from the background member opening 14. The shielding member 31 may be supported by a bracket 32 which is fixed to the background member, and a lamp socket 33 is preferably disposed between the background member and shielding plate, and mounted on the latter. Thus, an observer is shielded from the direct rays of a lamp 34 inserted in the socket 33, while the lamp is properly positioned for fully illuminating the display device. (For the sake of clarity of illustration, the lamp 34 is not indicated in Figure 1.)

In the event that clockwise rotation of the hoop 20 is inadvertently attempted, such movement will be prevented by engagement of one of the paddles 9 with the background member 11. That is, as the cam 25 has initiated turning of the radially outward portion of paddle A into the opening 14, the left-hand edge of paddle A (as seen in Figure 3) will abut against the left-hand edge of the opening 14 to prevent clockwise hoop rotation.

From the foregoing, it will be seen that the invention provides a display device which fully accomplishes its intended objects, and is well adapted to meet practical conditions of manufacture and use.

Although the invention has been described in some detail by way of illustration and example for purposes of clarity of understanding, it is to be understood that certain changes and modifications may be made within the spirit of the invention and without necessarily departing from the spirit and scope of the appended claims.

Having thus described my invention what I claim as new and desire to secure by Letters Patent is:

1. An animated display comprising an endless carrier, drive means for effecting movement of said carrier along a predetermined closed path, a plurality of display elements rotatably supported on said carrier for rotation thereabout and movable therewith along said path, each display element having front and rear display faces, and a stationary cam positioned in said path and engageable by successive display elements for effecting substantially 180° rotation thereof about said carrier, all of said display elements thus being reversed to present opposite faces upon successive cycles of carrier movement.

2. An animated display according to claim 1, in combination with a background member adjacent to yet spaced from said carrier so as to restrain rotative movements of said display elements and permit free movement of said carrier and display elements along said path, there being an opening provided in said background member in the region of said cam to permit rotation of said display elements in said region.

3. An animated display according to claim 2, in combination with a shielding member in front of said opening and cam and providing a cover for a source of illumination, said shielding member serving to conceal said rotative movement and present the visual effect of different series of display elements entering and emerging from behind said shielding member.

4. An animated display according to claim 1, said cam comprising an elongated member extending generally spirally along the path of movement of said display elements for initiating and sustaining rotation of the latter through approximately 180°.

5. An animated display according to claim 1, said carrier comprising a generally circular hoop mounted for rotative movement about its axis, the cam being so located that all points along said hoop pass adjacent to said cam during one hoop revolution.

6. An animated display comprising a hoop mounted for rotation about its axis, a plurality of display elements rotatably mounted on said hoop for movement therewith and individually rotatable about the adjacent hoop portion, and a stationary cam adjacent to said hoop and successively engageable by said display elements for effecting a predetermined angle of rotation thereof about said adjacent hoop portions, all of said display elements thus being rotated about their adjacent hoop portions upon each cycle of hoop rotation.

7. An animated display according to claim 6, said cam comprising an elongated member of generally spiral configuration and of sufficient length to effect substantially 180° rotation of said display elements about their adjacent hoop portions, whereby said display elements are reversed to present opposite sides upon successive cycles of carrier movement.

8. An animated display comprising an upstanding background plate, there being an opening formed in said background plate, a generally circular hoop arranged in front of said background plate with one portion in front of said opening and mounted on said plate for axial rotation, a plurality of display elements rotatably mounted on said hoop for movement therewith and each turnable independently about the adjacent hoop portion, said display elements being engageable with said background plate to restrain said turning movement except in the region of said plate opening, and a cam fixed to said background plate in the region of said opening and engageable with said display elements for effecting substantially 180° turning thereof through said opening, all of said display elements thus being reversed to present opposite sides upon successive cycles of hoop movement.

9. An animated display according to claim 8, said display elements being sufficiently close together so that at least one display element will always be in the act of turning through said opening upon rotation of said hoop in one direction, whereby rotation of said hoop in the other direction will be restrained by engagement of said one display element with the bounding edge of said opening.

10. An animated display comprising a hoop mounted for rotation about its axis, a plurality of display elements carried by said hoop for movement therewith, each display element being rotatably mounted for independent rotation about the adjacent hoop portion as an axis and provided with a plurality of display faces that become successively visible as the display element is rotated, and a stationary cam adjacent to said hoop and positioned to be successively encountered by said display elements as the hoop is rotated, said cam being configured to impart a turning movement to each display element on its own axis of rotation.

11. An animated display according to claim 10, said display elements being arranged on said hoop in close side-by-side proximity and conjointly presenting to view a composite arcuate display area.

12. An animated display according to claim 11, each display element being relatively flat to provide two display faces that become successively visible upon rotation of the display element on its own axis through 180°.

13. An animated display comprising an endless carrier, drive means for effecting movement of said carrier along a predetermined closed path, a plurality of display elements movable with said carrier along said path and being rotatably supported on said carrier for rotation about axes disposed substantially end-to-end along said path, each display element having front and rear display faces, and a stationary cam disposed in said path in position to be contacted directly by successive display elements for effecting substantially 180° rotation thereof about their axes, all of said display elements thus being reversed to present opposite faces upon successive cycles of carrier movement.

References Cited in the file of this patent
UNITED STATES PATENTS

| | | |
|---|---|---|
| 489,027 | McDonald | Jan. 3, 1893 |
| 1,344,642 | Locasto | June 29, 1920 |
| 2,202,417 | Fleming | May 28, 1940 |